(12) United States Patent
Hattaway et al.

(10) Patent No.: US 10,672,090 B1
(45) Date of Patent: *Jun. 2, 2020

(54) CUSTOMER INCAPACITY MANAGEMENT

(71) Applicant: Wells Fargo Bank, N.A., San Francisco, CA (US)

(72) Inventors: Joe Hattaway, Charlotte, NC (US); Kourtney Eidam, Sunnyside, NY (US); Michael Thomas Duke, Monroe, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,119

(22) Filed: Oct. 21, 2019

Related U.S. Application Data (63) Continuation of application No. 14/992,633, filed on Jan. 11, 2016, now Pat. No. 10,453,156.

(60) Provisional application No. 62/263,308, filed on Dec. 4, 2015.

(51) Int. Cl.
*G06Q 50/18* (2012.01)
*G06Q 40/00* (2012.01)

(52) U.S. Cl.
CPC ........... *G06Q 50/186* (2013.01); *G06Q 40/00* (2013.01)

(58) Field of Classification Search
CPC .................................................. G06Q 50/186

USPC ......................................................... 235/379
See application file for complete search history.

(56) References Cited

U.S. PATENT DOCUMENTS

| | | | |
|---|---|---|---|
| 5,884,288 A | 3/1999 | Chang et al. |
| 6,070,150 A | 5/2000 | Remington et al. |
| 7,124,087 B1 | 10/2006 | Rodriguez et al. |
| 7,182,253 B1 | 2/2007 | Long |
| 7,827,102 B2 | 11/2010 | Saliba et al. |
| 7,945,512 B2 | 5/2011 | Scipioni et al. |
| 8,266,031 B2 | 9/2012 | Norris et al. |
| 8,566,237 B2 | 10/2013 | Forzley |
| 8,700,527 B2 | 4/2014 | Dolphin |
| 8,762,230 B2 | 6/2014 | Webber et al. |
| 9,225,753 B1 | 12/2015 | Maxwell |
| 2007/0192114 A1 | 8/2007 | Parpala |
| 2010/0274691 A1 | 10/2010 | Hammad et al. |
| 2011/0047628 A1 | 2/2011 | Viars |
| 2011/0270748 A1 | 11/2011 | Graham et al. |
| 2013/0291099 A1 | 10/2013 | Donfried et al. |
| 2014/0214644 A1 | 7/2014 | Rephlo et al. |
| 2014/0244453 A1 | 8/2014 | Rephlo |
| 2015/0288797 A1 | 10/2015 | Vincent |

*Primary Examiner* — Toan C Ly
(74) *Attorney, Agent, or Firm* — Walter Haverfield LLP; James J. Pingor (57) ABSTRACT

Systems and method of managing incapacity of a customer is provided. The subject innovation can determine when a customer cannot receive financial communications due to incapacity. The determination can be made due to lack of a response from the customer or to account activity indicating the customer may be incapacitated. The innovation can default to a designated person for sending financial communications of the customer upon a determination of incapacity.

20 Claims, 6 Drawing Sheets

CUSTOMER INCAPACITY MANAGEMENT

CROSS-REFERENCE TO RELATED APPLICATIONS

This application is a continuation of U.S. patent application Ser. No. 14/992,633, filed Jan. 11, 2016, and entitled "CUSTOMER INCAPACITY MANAGEMENT," which claims priority to U.S. Provisional Application No. 62/263,308, filed Dec. 4, 2015, and entitled "CUSTOMER INCAPACITY MANAGEMENT." The entireties of these applications are expressly incorporated herein by reference.

BACKGROUND

Financial institutions provide important communications to customers. Such communications can be time sensitive and affect customers' finances and earnings. Although it is helpful to maintain confidentiality of these communications regarding customers' private accounts, situations oftentimes arise when a customer is unable to receive the communications. For example, when a customer is incapacitated due to medical issues or death. Such instances are often unexpected such that a customer has not properly arranged for financial communications to be attended to.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of managing incapacity of a customer of a financial institution. In aspects of the innovation, a system is contemplated where the likelihood the customer is incapacitated or otherwise unable to receive financial communications can be determined. It is further contemplated that the system may identify a second or alternate recipient (e.g., person, device, etc.) associated with the customer to send the financial communications.

In aspects, the subject innovation provides substantial benefits for managing incapacity of a customer. For instance, the innovation can determine when a customer cannot receive financial communications. The innovation can default to a designated recipient for sending financial communications of the customer upon a determination of incapacity. Other aspects can provide rules for detecting incapacity. These and other benefits of the innovation will be better understood upon a review of the detailed description infra.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers or special-purpose machines.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
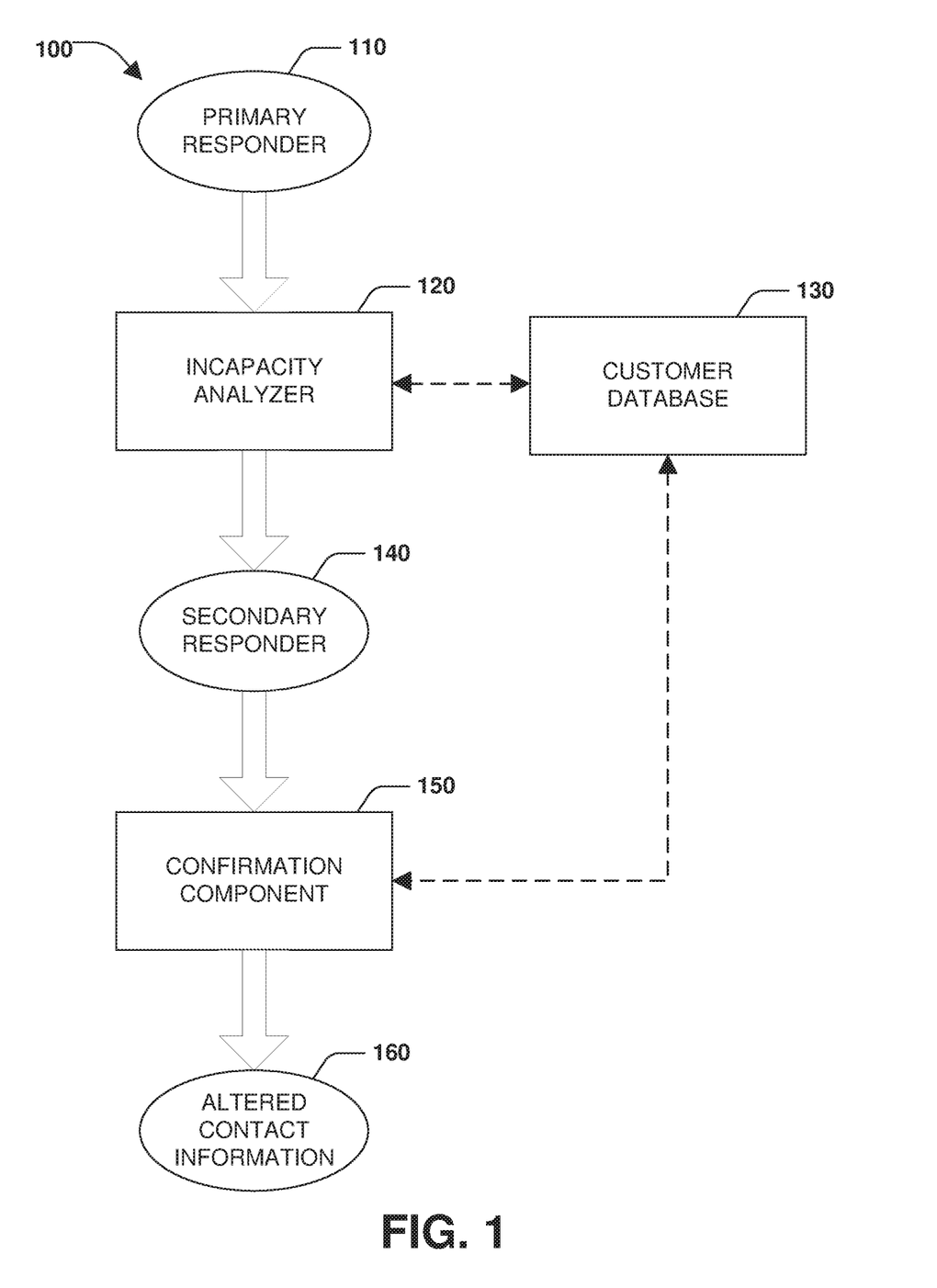
FIG. 1 illustrates an example input/output diagram for determining incapacity of a customer and altering receipt of financial communications.

With reference to FIG. 1, an example input/output diagram 100 for managing incapacity of a customer is depicted. A primary responder 110 receives regular communications from a financial institution. In this example, the primary responder 110 is a customer and/or client of a financial institution. The financial institution sends regular communications on a selected communications mode. The communications can be updates on account status, statements, notices, alerts, or the like. The communications can be made over text SMS/MMS, push notifications via a mobile device application, email, paper mail, or the like. While aspects described herein are specific to the financial industry, it is to be understood that the features, functions and benefits of the innovation can be employed in alternative industries and aspects without departing from the spirit and/or scope of the innovation described and claimed herein.

An incapacity analyzer 120 determines whether the primary responder 110 is incapacitated and therefore unable to continue receiving (or respond to) communications. In one embodiment, the incapacity analyzer 120 requests confirmation from the primary responder 110 to continue receiving communications. In another embodiment, the incapacity analyzer 120 sends a separate communication for which the primary responder 110 can respond. In yet another embodiment, the incapacity analyzer 120 inserts a confirmation request into a regular communication that is to be sent to the primary responder 110. For example, a confirmation request can be inserted into a monthly account statement sent to the primary responder 110 at the end of the month or some other predetermined or random frequency.

The incapacity analyzer 120 accesses a customer database 130 of the financial institution. The incapacity analyzer 120 accesses the primary responder's 110 account information in the customer database 130. The customer database 130 includes information about the primary responder 110. The information can include contact information, preferred contact mode, secondary contacts, emergency contacts, secondary devices, and the like. In one embodiment, the information includes account activities. The account activities can include financial transactions, credit amounts, deposits, payments, and/or other financial information. The incapacity analyzer 120 will be described in further detail below.

Upon sending the confirmation request, the incapacity analyzer 120 triggers a timeout period during which a response to the confirmation is expected. The timeout period can be a predetermined default time period or can be user selected. For example, the timeout period can be a default one week or can be user selected to one month according to a user preference in the customer database 130. In aspects, the sender can override the user defined threshold thereby requiring a response in designated time period. If the incapacity analyzer 120 receives a confirmation during the timeout period, the incapacity analyzer 120 cancels the timeout period. In one embodiment, the response is a reply to an email or text (SMS, MMS, etc.) message. In other embodiments, the response can include one of a token or passcode. In another embodiment, the response is a selection of a link in the communication and/or checking a box to continue receiving financial communications. Still further, the response may require customer specific (e.g., confidential) information that is most often only known to the recipient.

If the incapacity analyzer 120 does not receive a sufficient confirmation during the timeout period, the incapacity analyzer 120 accesses the customer database 130 to retrieve contact information for a secondary responder 140. The secondary responder 140 is a person designated by the primary responder 110. The secondary responder 140 is selected to begin receiving financial communications regarding the primary responder's 110 accounts in the case the primary responder 110 is unable to receive and/or comprehend the financial communications.

While the aspects herein disclose a secondary responder, it is to be understood that the customer can designate a second, third, fourth, etc. number of responders as desired. Moreover, the innovation discloses an ability to map specific types of communications to specific secondary responders. For instance, if a communication is related to a mortgage and returned (e.g., due to incapacity) the system redirects it to X. Similarly, if the communication is related to a legal matter, the system redirects it to Y. It will be understood that this level of personalization has endless options and combinations, all of which are to be included within the scope of this disclosure and claims appended hereto.

In one embodiment, the incapacity analyzer 120 can send all (or a designated subset of) financial communications to the secondary responder 140. In another embodiment, a confirmation component 150 sends a confirmation request to the secondary responder 140. The confirmation component 150 waits for an affirmative response from the secondary responder 140 to the confirmation request to begin receiving the financial communications. The confirmation component 150 triggers a timeout period during which a response to the confirmation is expected. The timeout period can be a default time period or can be user selected. For example, the timeout period can be a default one week or can be user selected to one month according to a user preference. If the confirmation component 150 does not receive a confirmation, communications are not sent to the secondary responder 140.

If the confirmation component 150 receives a confirmation during the timeout period, the confirmation component 150 cancels the timeout period and forwards appropriate financial communications associated with the primary responder's 110 account to the secondary responder 140. In one embodiment, the confirmation component 150 may request the secondary responder 140 to register information with the financial institution. The confirmation component 150 can update the customer database 130 with the secondary responder 140 information. The confirmation component 150 can associate the secondary responder 140 information with the primary responder's 110 account in the customer database 130.

In one embodiment, the communications sent to the secondary responder 140 are stopped when the primary responder 110 responds to a confirmation request or otherwise interrupts the communications. The primary responder 110 may access the account to interrupt the communications or affirmatively select to cease communications to the secondary responder.

Figure 2:
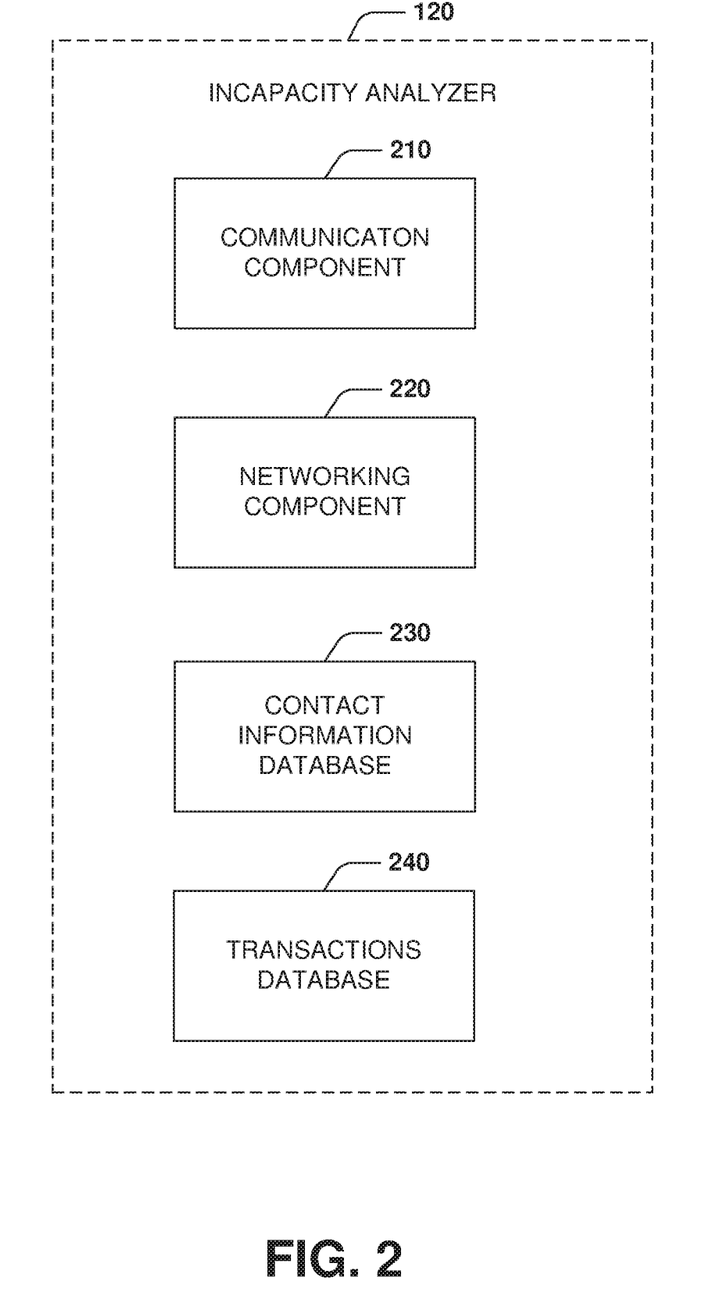
FIG. 2 illustrates an example component diagram of an incapacity analyzer.

With reference to FIG. 2, and continuing reference to FIG. 1, a component diagram of the incapacity analyzer 120 is depicted. The incapacity analyzer 120 includes a communication component 210. The communication component 210 generates financial communications to send to the primary responder 110. The communications component 210 can be triggered as part of a routine account update to be sent the primary responder or upon a predetermined event. For example, the communication can be a monthly (or periodic) account statement. As another example, the communication is an alert triggered when an account balance goes below a dollar amount threshold.

The incapacity analyzer 120 includes a networking component 220. The networking component can connect to a mobile network, wired LAN, wireless LAN, an internet network, or the like to transmit communications. The networking component 220 connects to a transmission server to send and receive communications, alerts, or the like to and from a user device. The mode of the communication can be text, SMS, MMS, email, push notification via an interface, or the like. In one embodiment, the user device installs an application provided by the financial institution such that the communications activate the application on the user device when the transmission server sends a communication to the user device.

The incapacity analyzer 120 includes a contact information database 230. The contact information database 230 includes a contact profile for each primary responder 110. The contact profile includes user preferences for contacting the primary responder. Further, the contact profile includes information for secondary responders 140, e.g. backup contacts.

In one embodiment, the incapacity analyzer 120 includes a transactions database 240. The transactions database 240 includes activities associated with the primary responder's 110 account. The incapacity analyzer 120 monitors the transactions database 240 to make or facilitate a determination that a primary responder 110 is incapacitated (or otherwise unavailable for an extended period). In a specific example, the incapacity analyzer 120 monitors the transactions database 240 for triggers indicative that the primary responder 110 is incapacitated. For example, the triggers can include an increase or decrease in the volume of credit transactions, high or consistent charges to hospitals or health care institutions, absence of logins and login attempts to view the account, or the like. In one embodiment, the triggers are used in conjunction with the timeout period to determine incapacity. For example, a trigger can cause an alert to be sent to the primary responder 110. The alert begins a timeout period during which a response is expected.

Figure 3:
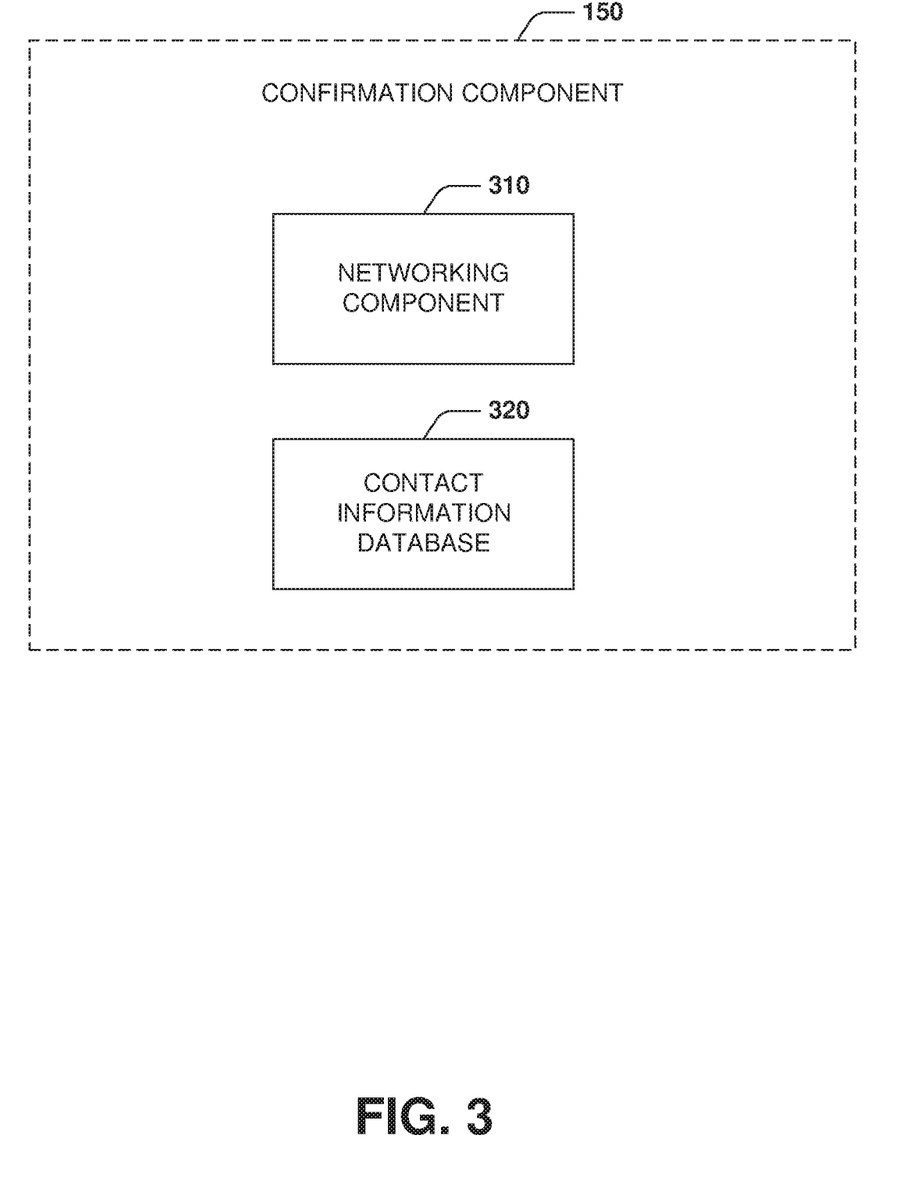
FIG. 3 illustrates an example component diagram of a confirmation component.

With reference to FIG. 3, and continuing reference to FIG. 1, a component diagram of the confirmation component 150 is depicted. The confirmation component 150 includes a networking component 310 and a contact information database 320. The networking component can connect to a mobile network, wired LAN, wireless LAN, an internet network, or the like to transmit communications. The networking component 310 connects to a transmission server to send and receive communications, alerts, or the like to and from a user device. The mode of the communication can be text, SMS, MMS, email, push notification via an interface, or the like. The user device installs an application (or the application is otherwise installed) such that the communications activate the application on the user device when the transmission server sends a communication to the user device.

The confirmation component 150 includes a contact information database 320. The contact information database 320 includes a contact profile of each primary responder 110 and secondary responder 140. The contact profile includes user preferences for contacting the primary responder 110 and secondary responder 140. The contact profile can be updated with further information for secondary responders 140, for instance, after a registration is completed by the secondary responder 140.

Figure 4:
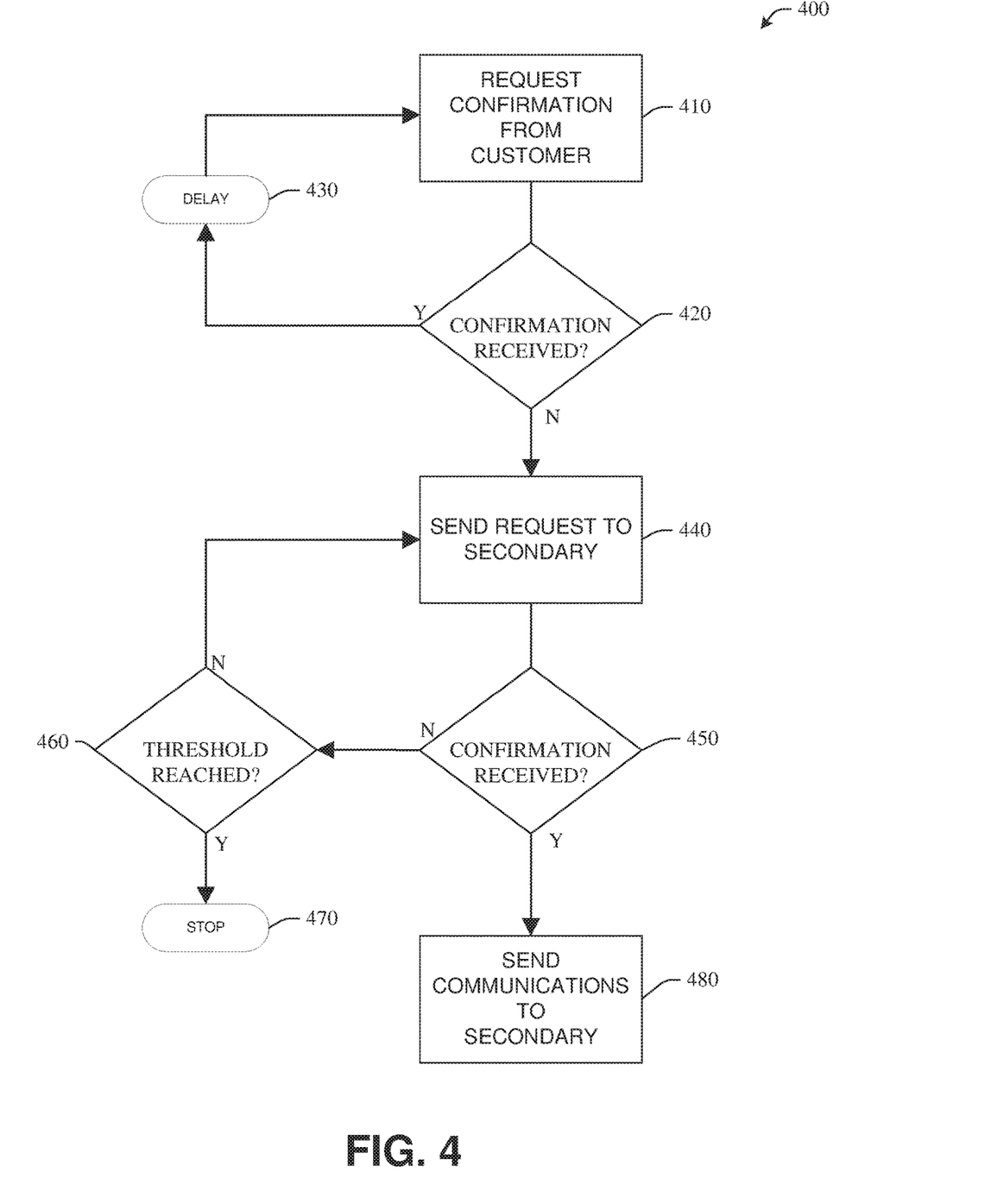
FIG. 4 illustrates a flowchart to for determining incapacity.

With reference to FIG. 4, an example method 400 is depicted for authenticating a customer of a financial institution. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

In aspects, method 400 can begin at 410 by sending a communication to a customer. For example, a financial institution sends a statement associated with a customer's account to the customer. Included in the statement is a request to keep receiving communications from the financial institution. As another example, a separate communication can be sent requesting confirmation the customer is still receiving the communications from the financial institution. In one embodiment, the separate communication can be made on a communication mode that is different from the mode used in sending statements. For example, statements can be sent to the customer's email and the confirmation request is sent as a text message to the customer's mobile device.

At 420, a check is performed as to whether the customer has responded to the confirmation. The check is performed either during or after a timeout period that triggers when the confirmation and/or communication is sent. If a confirmation is received, a delay 430 is triggered. The delay 430 can be customer selected or a default from the financial institution. The delay 430 facilitates an amount of time passing after a confirmation has been received before another confirmation is requested. After the delay 430, the method returns to 410 and requests another confirmation.

If a confirmation is not received during a timeout period at 420, the method determines that the customer may be incapacitated. At 440, the method sends a request to a secondary person. The secondary person can be designated by the customer to begin receiving communications from the financial institution. In one embodiment, the secondary person is the designated emergency contact.

At 450, a check is performed as to whether the secondary person has responded to the confirmation. The check is performed during and/or after a timeout period that triggers when the confirmation communication is sent. If a response is received before the end of the timeout period, the timeout period is interrupted and the method 400 proceeds. If a confirmation is not received, a check 460 is performed for a count of confirmation requests sent to the secondary person. If the number of requests is below a predetermined threshold, the request is re-sent to the secondary person and a new timeout period is triggered. The sending of requests after a timeout period iterates until a threshold for unconfirmed requests is reached. When the threshold is reached, the method stops at 470.

If a confirmation is received, any further communications that are typically sent to the customer are sent to the secondary person at 480. For example, a secondary person confirms to receive the financial communications. In this example, the next monthly statement to be sent to the customer is sent to the secondary person instead. In one embodiment, the statement is sent to the customer and the secondary person.

Figure 5:
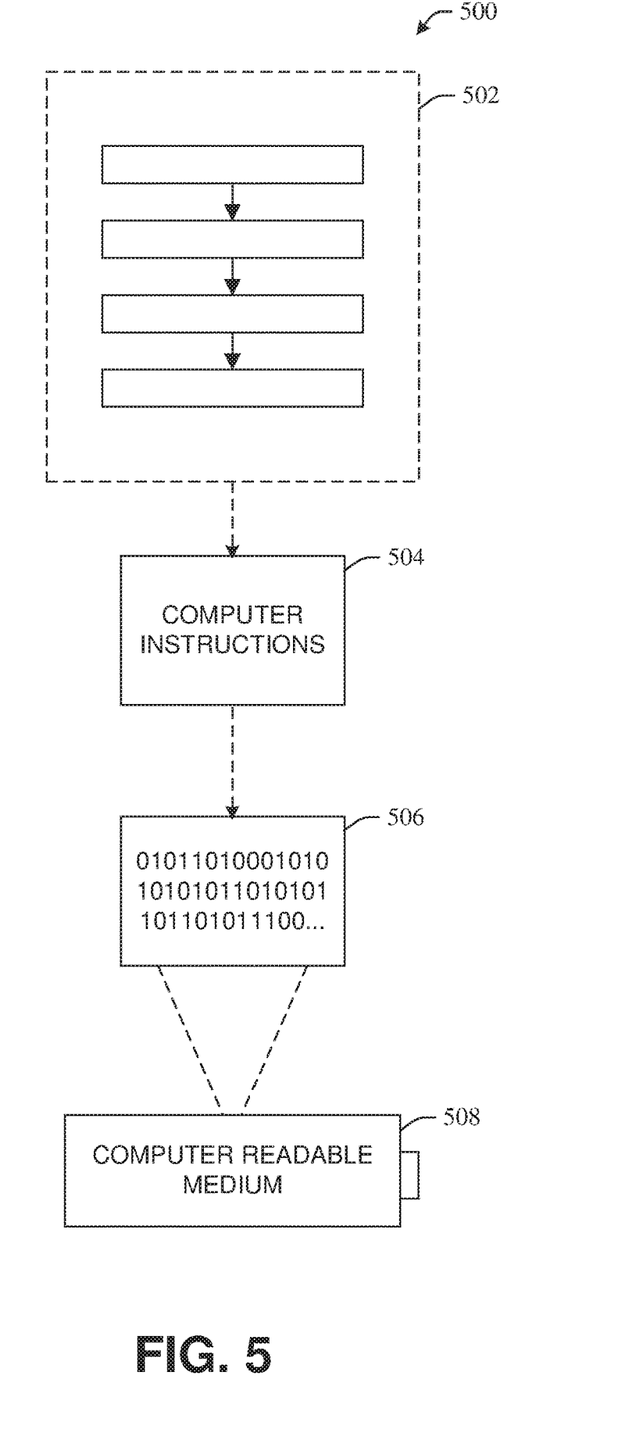
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
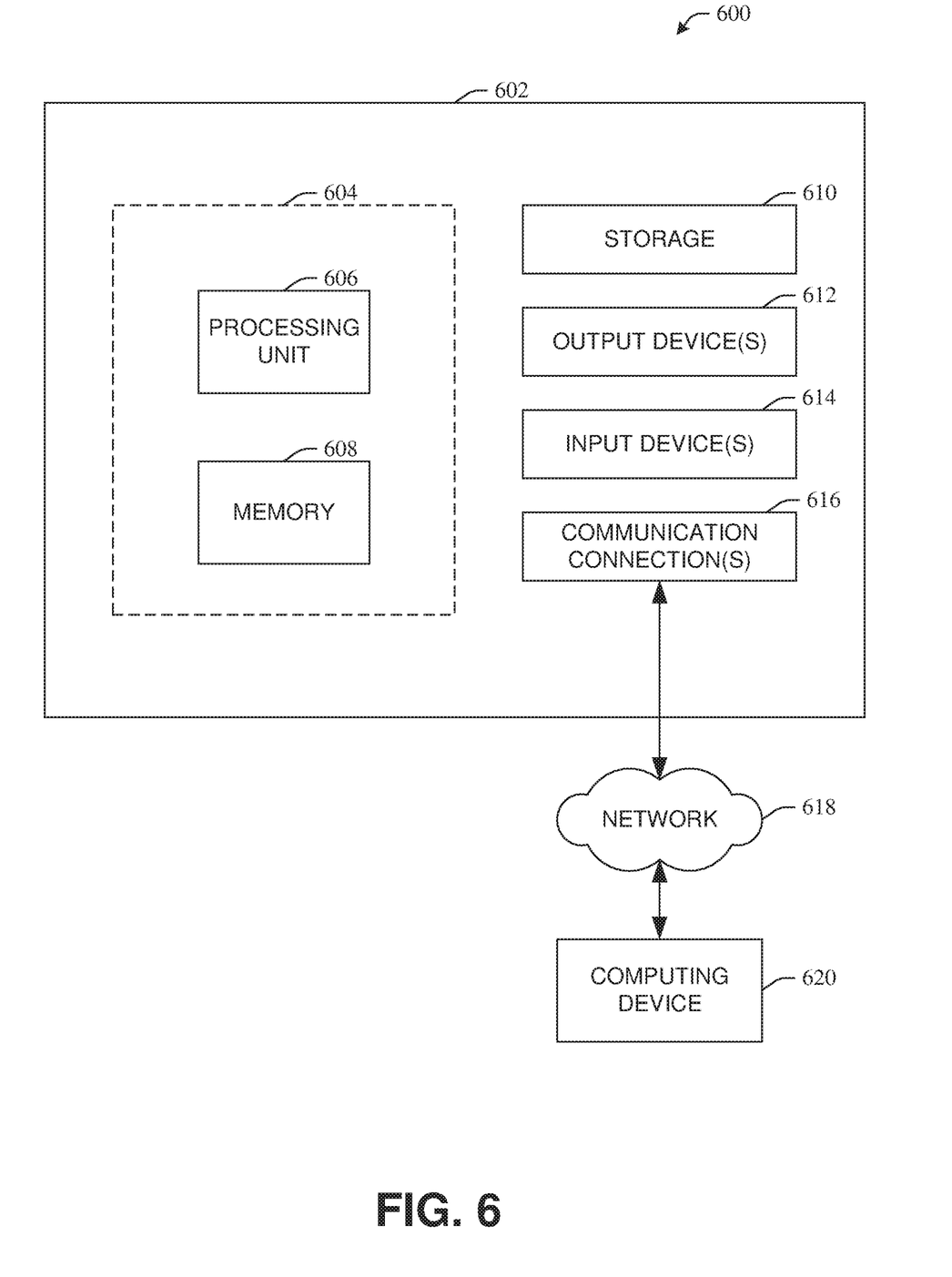
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor coupled to a memory storing instructions that when executed by the processor cause the processor to:
detect at least one trigger in an account history of financial transactions of a primary responder indicative of an inability to receive financial communications; and
send the financial communications to a secondary responder based on detection of the at least one trigger.

2. The system of claim 1, further comprising instructions that cause the processor to:

send a confirmation request to the secondary responder to receive the financial communications of the primary responder; and receive confirmation from the secondary responder to accept responsibility to receive the financial communications on behalf of the primary responder.

3. The system of claim 2, further comprising instructions that cause the processor to:

request the secondary responder provide registration information; and update a user account database entry associated with the primary responder with information of the secondary responder.

4. The system of claim 1, further comprising instructions that cause the processor to send the financial communications to the primary responder and the secondary responder.

5. The system of claim 4, further comprising instructions that cause the processor to stop sending the financial communications to the secondary responder after the primary responder interrupts communications.

6. The system of claim 1, further comprising instructions that cause the processor to:

determine a type of the financial communications; and send the financial communications to a specific secondary responder based on the type.

7. The system of claim 1, wherein the at least one trigger comprises a change in volume of transactions.

8. The system of claim 1, wherein the at least one trigger comprises an increase in recent hospital charges.

9. The system of claim 1, wherein the at least one trigger comprises an absence of logins or login attempts to access an account of the primary responder.

10. A method, comprising:

executing, on a processor, instructions that cause the processor to perform operations comprising:

identifying at least one trigger in an account history of financial transactions of a primary responder that indicates an inability to receive financial communications; and sending the financial communications to a secondary responder after identification of the at least one trigger.

11. The method of claim 10, wherein detecting the at least one trigger further comprises detecting a change in volume of transactions.

12. The method of claim 10, wherein detecting the at least one trigger further comprises detecting an increase in hospital charges.

13. The method of claim 10, wherein detecting the at least one trigger further comprises detecting an absence of logins or login attempts to access an account of the primary responder.

14. The method of claim 10, the operations further comprising:

sending a confirmation request to the secondary responder to receive the financial communications of the primary responder; and receiving confirmation from the secondary responder to accept responsibility to receive the financial communications on behalf of the primary responder.

15. The method of claim 14, the operations further comprising:

requesting the secondary responder provide registration information; and updating a user account database entry associated with the primary responder with information of the secondary responder.

16. The method of claim 10, the operations further comprising:

determining a type of the financial communications; and sending the financial communications to a specific secondary responder based on the type.

17. The method of claim 10, the operations further comprising sending the financial communications to the primary responder and the secondary responder.

18. A computer readable medium having instructions stored thereon that enable at least one processor to perform a method upon execution of the instructions, the method comprising detecting at least one trigger in an account history of financial transactions of a primary responder indicative of an inability to receive financial communications; and sending the financial communications to a secondary responder based on detection of the at least one trigger.

19. The computer readable medium of claim 18, wherein detecting the at least one trigger further comprises at least one of detecting change in volume of transactions, increase in hospital charges, or absence of logins or login attempts.

20. The computer readable medium of claim 18 further comprising determining a type of the financial communications and sending the financial communications to a specific secondary responder based on the type.

* * * * *